(12) United States Patent
Stuber

(10) Patent No.: US 10,422,147 B2
(45) Date of Patent: Sep. 24, 2019

(54) SPEED LEAD AND BRACKET

(71) Applicant: MARV POST ENTERPRISES, Minnetonka, MN (US)

(72) Inventor: Benjamin T. Stuber, New Prague, MN (US)

(73) Assignee: MARV POST ENTERPRISES, Minnetonka, MN (US)

( * ) Notice: Subject to any disclaimer, the term of this patent is extended or adjusted under 35 U.S.C. 154(b) by 133 days.

(21) Appl. No.: 15/815,190

(22) Filed: Nov. 16, 2017

(65) Prior Publication Data

US 2018/0245359 A1    Aug. 30, 2018

Related U.S. Application Data

(60) Provisional application No. 62/463,178, filed on Feb. 24, 2017.

(51) Int. Cl.
*E04G 21/18* (2006.01)
*F16M 13/02* (2006.01)
*E04G 21/22* (2006.01)

(52) U.S. Cl.
CPC ....... *E04G 21/1841* (2013.01); *F16M 13/022* (2013.01); *E04G 21/22* (2013.01)

(58) Field of Classification Search
CPC .... E04G 21/1841; E04G 21/22; F16M 13/022
USPC .......................................................... 33/518
See application file for complete search history.

(56) References Cited

U.S. PATENT DOCUMENTS

| | | | | |
|---|---|---|---|---|
| 2,761,214 A * | 9/1956 | Ruble | ................. | E04G 21/1816 33/406 |
| 3,349,494 A * | 10/1967 | Blake | ................. | E04G 21/1816 33/410 |
| 4,569,179 A | 2/1986 | Post | | |
| 5,873,211 A * | 2/1999 | Post | .................... | E04G 21/1808 33/404 |
| 2018/0245359 A1 * | 8/2018 | Stuber | ................. | E04G 21/1841 |

* cited by examiner

*Primary Examiner* — Yaritza Guadalupe-McCall
(74) *Attorney, Agent, or Firm* — Vidas Arrett & Steinkraus P.A.

(57) ABSTRACT

A bracket to hold a bricklayer's speed lead in position on a wall. The bracket, which is contoured to fit the speed lead, has two vertical flanges, one of which has the same or a larger vertical dimension than the other, a horizontal flange extending perpendicularly between the vertical flanges, and a stepped block beneath part of the horizontal flange at right angles to the horizontal flange and one of the vertical flanges. The bracket is also provided with a rotatably mounted cam and a rotatably mounted bushing.

7 Claims, 12 Drawing Sheets

SPEED LEAD AND BRACKET

CROSS-REFERENCE TO RELATED APPLICATIONS

This application is a utility application claiming priority to U.S. provisional application No. 62/463,178 filed on Feb. 24, 2017, the disclosure and entire contents of which are incorporated herein by reference.

STATEMENT REGARDING FEDERALLY SPONSORED RESEARCH

Not Applicable

FIELD OF THE INVENTION

The invention relates to a speed lead and bracket for bricklaying.

BACKGROUND OF THE INVENTION

Bricklayers use speed leads to enable them to lay plumb and level brick corners quickly. The speed lead is held to the brick wall by means of a bracket. With the type of bracket currently used in the industry, the speed lead fits into a slot in the bracket.

BRIEF SUMMARY OF THE INVENTION

The present invention is designed so that the speed lead fits between one of the flanges of the bracket and an adjustable cam. Advantages of the invention are that it can fit on either the inside or outside edge of the speed lead and it is reversible. This type of bracket is especially well-suited for use with a speed lead of the type described in my U.S. Pat. No. 4,569,179, which has a reversible clip.

DETAILED DESCRIPTION OF THE INVENTION

Figure 1:
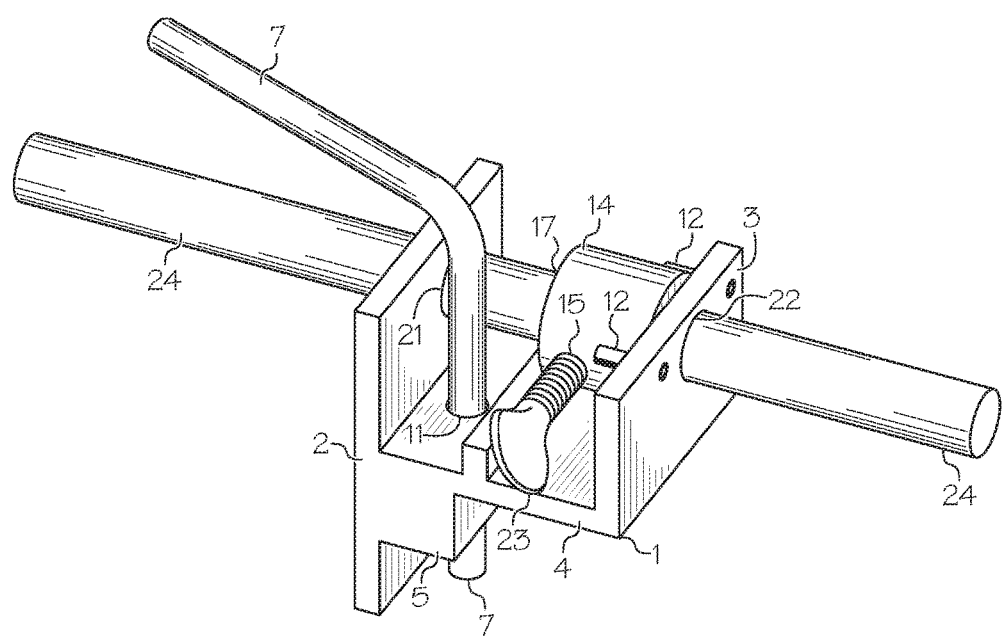
FIG. 1 is a side perspective view of the invention.
Figure 2:
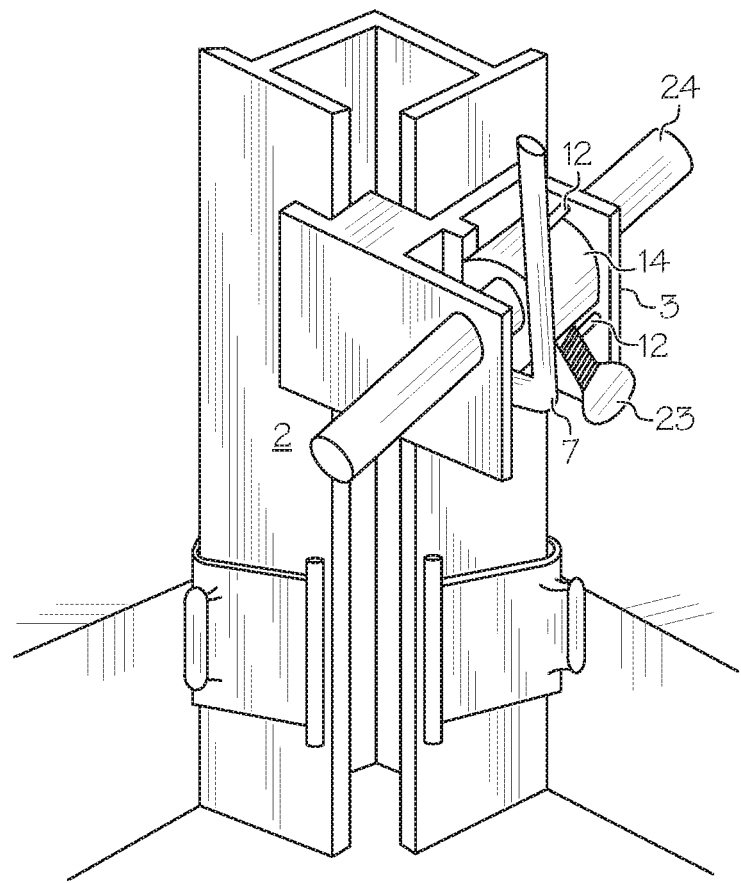
FIG. 2 shows an example of how the bracket may be attached to a speed lead which is being used on a corner of a brick wall.
Figure 3:
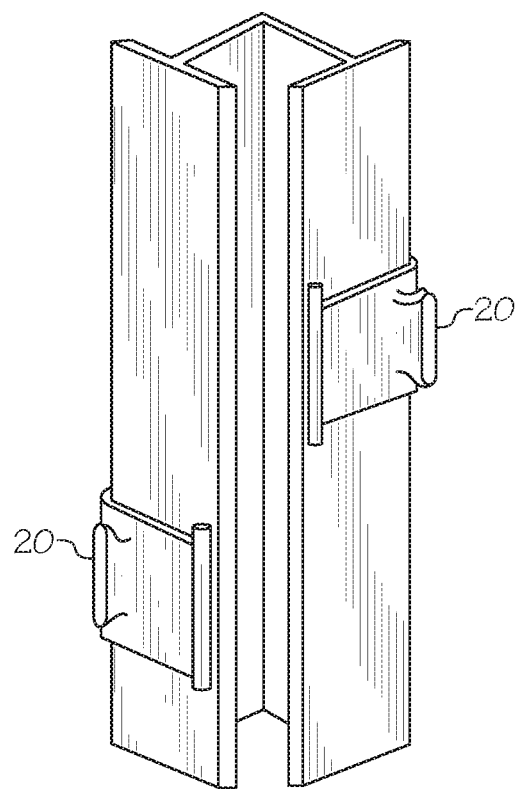
FIG. 3 shows a prior art (U.S. Pat. No. 4,569,179) speed lead with reversible clips.
Figure 4:
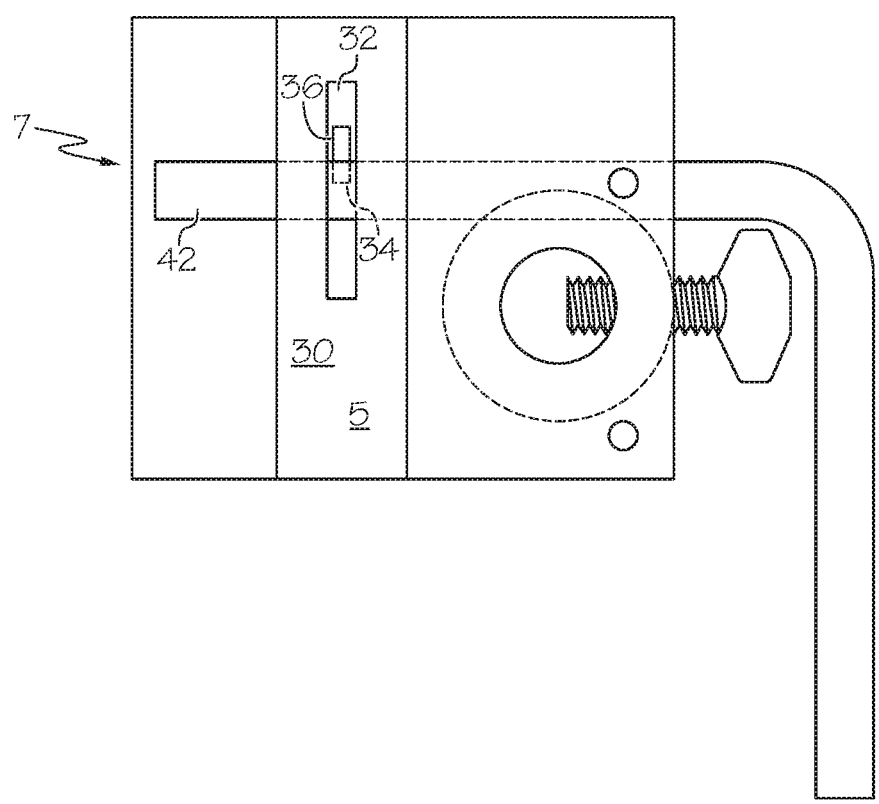
FIG. 4 shows a top view of one alternative embodiment of the invention.
Figure 5:
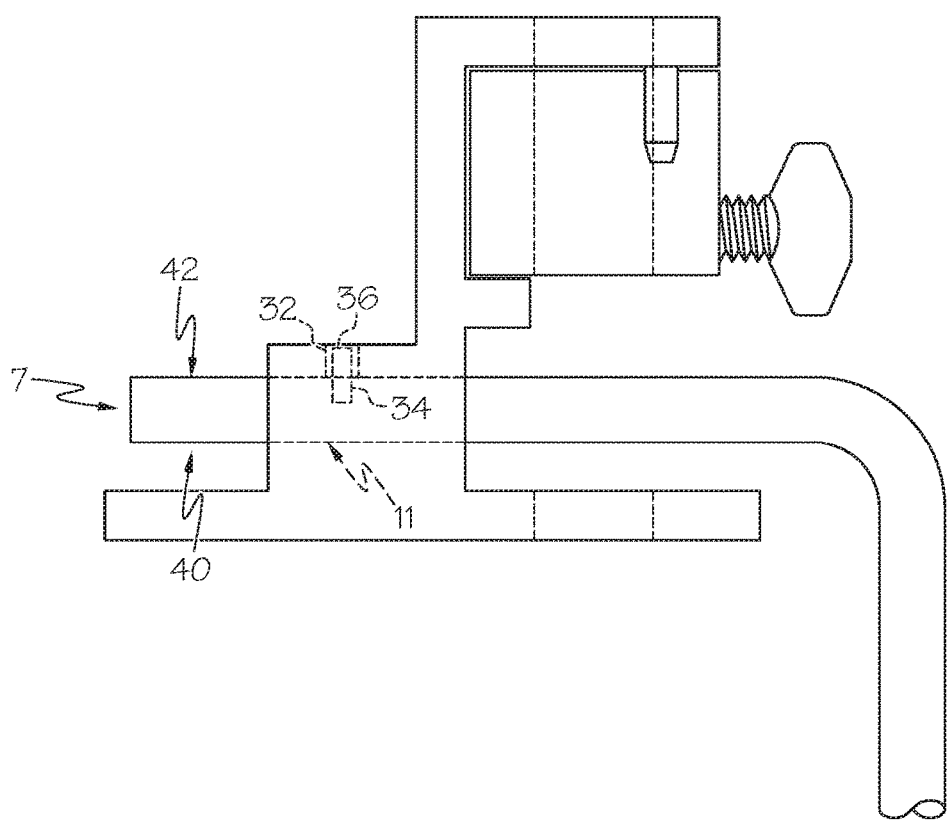
FIG. 5 shows a side view of one alternative embodiment of the invention.
Figure 6:
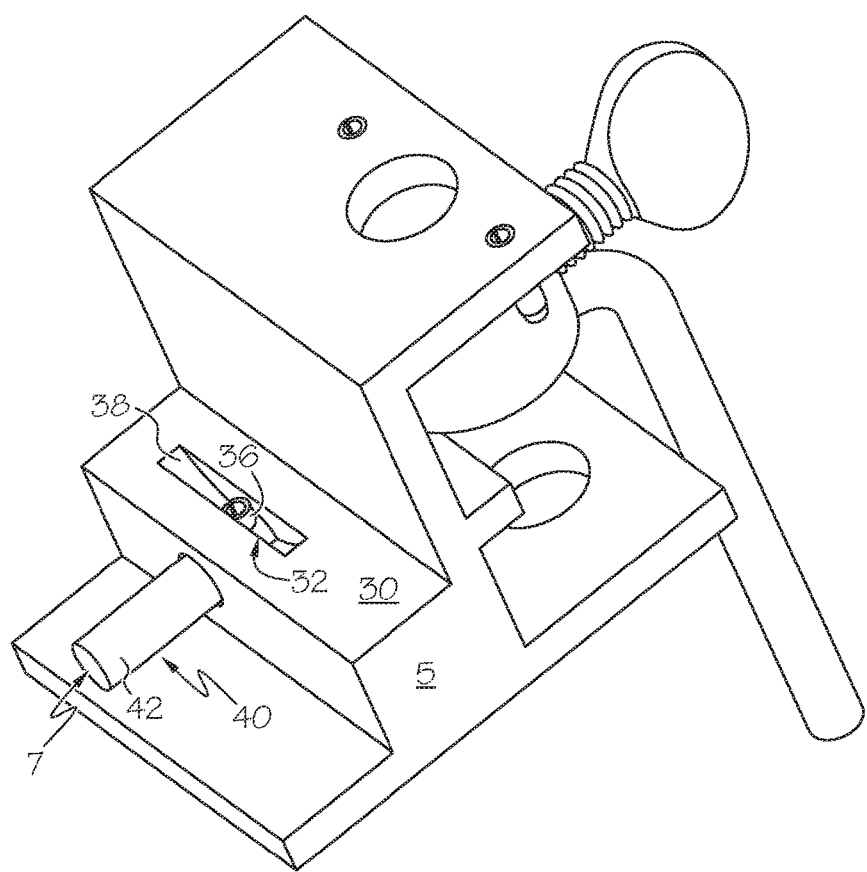
FIG. 6 shows an isometric view of one alternative embodiment of the invention.
Figure 7:
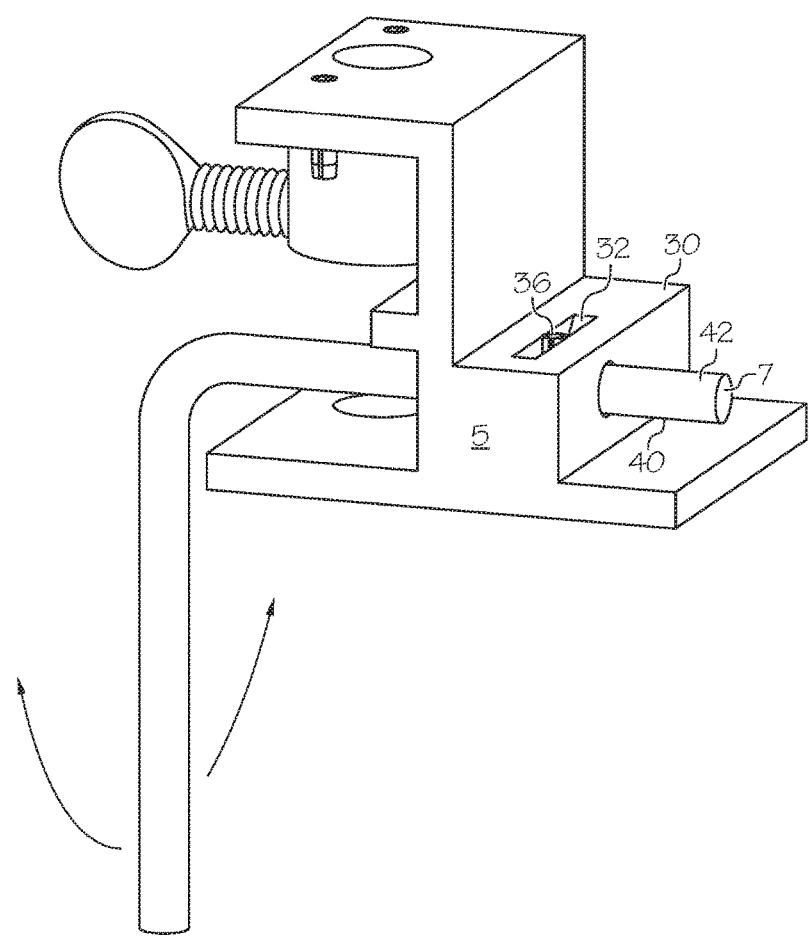
FIG. 7 shows a side isometric view of one alternative embodiment of the invention.
Figure 8:
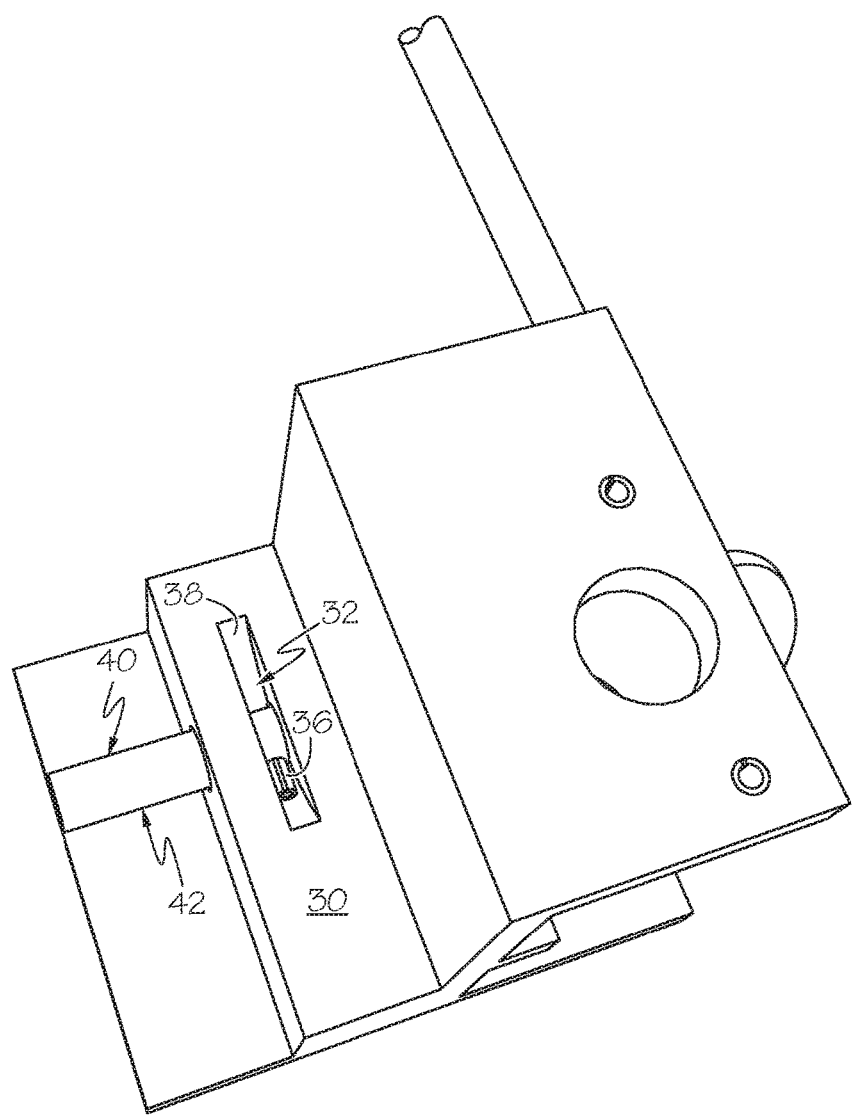
FIG. 8 shows an isometric view of one alternative embodiment of the invention.
Figure 9:
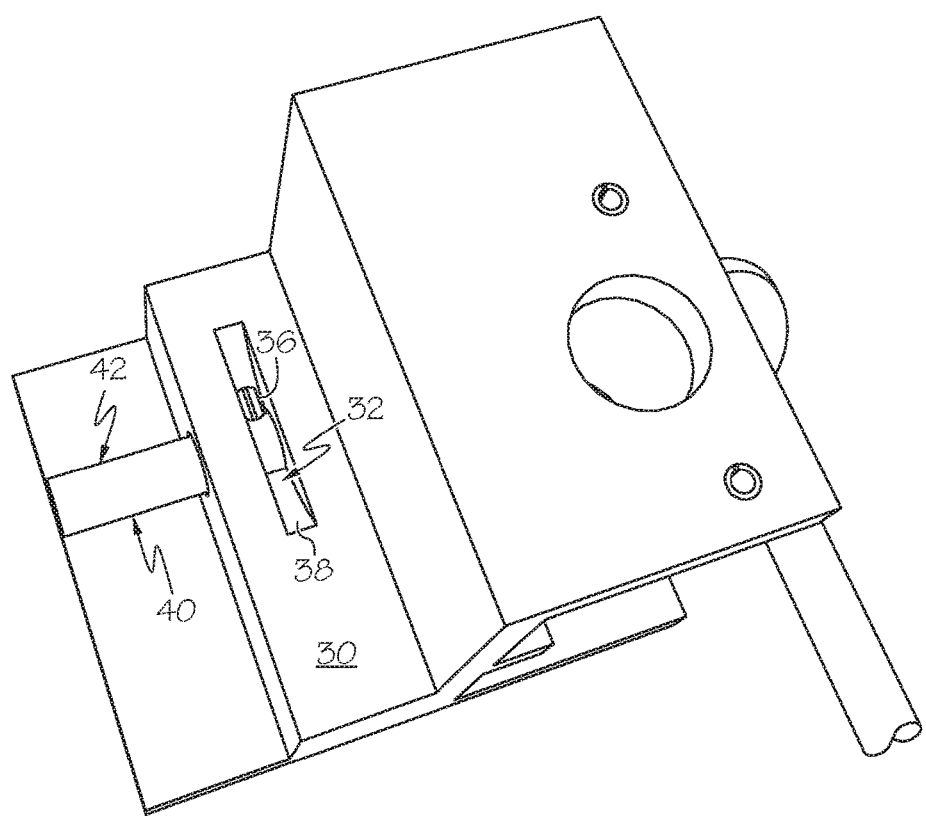
FIG. 9 shows an isometric view of one alternative embodiment of the invention.
Figure 10:
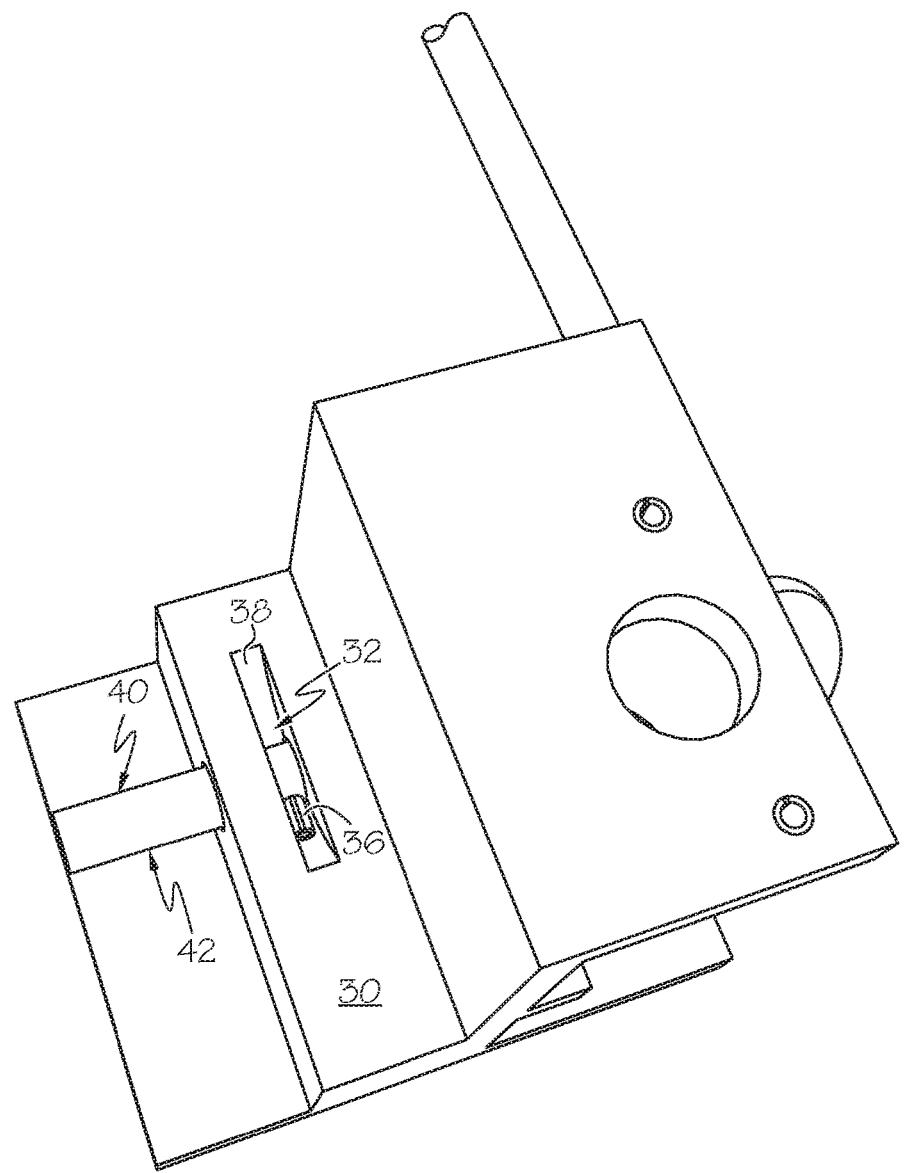
FIG. 10 shows an isometric view of one alternative embodiment of the invention.
Figure 11:
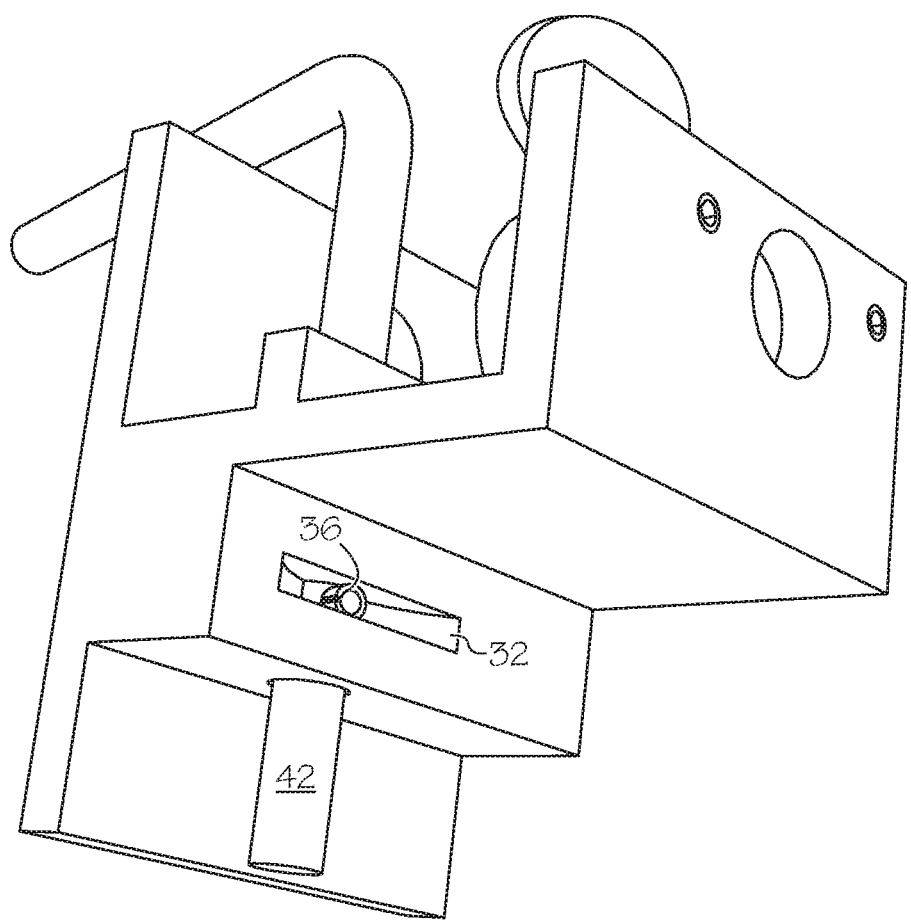
FIG. 11 shows an isometric view of one alternative embodiment of the invention.

While this invention may be embodied in many forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

The bracket has a base 1 which has a long vertical flange 2, a short vertical flange 3, and a horizontal flange 4 which extends from one end of the short vertical flange 3 to a point approximately midway along the length of the long vertical flange 2, perpendicular to both vertical flanges 2 and 3. A rectangular stepped block 5 is formed adjacent to of the horizontal flange 4 at right angles to the horizontal flange 4 and to the long vertical flange 2. It should be noted that the vertical flanges 2 and 3 may have the same vertical dimension in some embodiments.

An adjustable cam 7, which is a cylindrical shaft, is disposed vertically through an opening 11 in horizontal flange 4 and stepped block 5 so that an end of the cam 7 projects beyond the stepped block 5. Depending upon whether the speed lead is to be used on an inside or outside corner of the brick wall (W), either the inside or the outside edge of the speed lead is inserted into the space between the part of the cam 7 which projects beyond the stepped block 5 and the part of the long vertical flange 2 which extends outwardly from the stepped block 5. The speed 10 lead can be inserted either forward or backward. Thus there are four possible positions: speed lead facing forward with its outside edge held by bracket, speed lead facing forward with its inside edge held by bracket, speed lead facing backward with its inside edge held by bracket, or speed lead facing backward with its outside edge held by bracket. The cam 7 is rotated to tighten or loosen the bracket to allow the speed lead to be inserted or released. When the cam 7 is in the middle position in which a horizontal part of cam 7 extends at right angles crossing above the outer parts of either the long vertical flange 2 and the short flange 4, the bracket is loosened to allow the edge of the speed lead to be inserted; rotating the cam 7 in either direction (clockwise or counterclockwise directions) tightens the bracket to engage the edge of the speed lead. The two positions of maximum tightness occur when the cam 7 has been rotated clockwise ninety degrees from the middle position, or alternatively, the cam 7 has been rotated counterclockwise ninety degrees from the middle position.

Two cotter pins or prongs 12 project inward from the short vertical flange 3. An oversize shaft or bushing 14 is held in position between the prongs 12. The bushing 14 has a small opening 15 in its side into which a conventional thumbscrew 23 can be inserted, and a large central opening 17 into which a conventional rod 24 can be inserted, the rod 24 is also passed through openings 21 and 22 in vertical flanges 2 and 3, respectively. The bushing 14 and thumbscrew 23 can be used for in and out adjustment of the bracket on the wall W. The end of the rod 24 engages the wall. By loosening the thumbscrew 23, the bracket can be slid along the rod 24 to a position closer to or farther away from the wall and then held in that position by tightening the thumbscrew 23. The bushing 14 is rotatable through a one hundred eighty degree arc about its axis (the rod 24) so that the thumbscrew 23 may also be used on the opposite side of the bracket from that shown in FIG. 1, if necessary. inserted or released. The middle position of the cam 7 (horizontal part of cam 7 extending at right angles above the top of the long vertical flange 2) is to loosen the bracket; rotating the cam 7 in either direction tightens the bracket.

Two cotter pins or prongs 12 project inward from the short vertical flange 3. An oversize shaft or bushing 14 is held in position between the prongs 12. The bushing 14 has a small opening 15 in its side into which a conventional thumbscrew 23 can be inserted, and a large central opening 17 into which a conventional rod 24 can be inserted (the rod 24 is also passed through openings 21 and 22 in vertical flanges 2 and 3, respectively). The bushing 14 and thumbscrew 23 can be used for in and out adjustment of the bracket on the wall.

In some embodiments the working face 30 of block 5 includes a horizontal channel 32. Horizontal channel 32 preferably has a sufficient depth dimension to communicate with passage identified as openings 11 through block 5. Passage/opening 11 preferably extends vertically through block 5 from top to bottom. Cam 7 as positioned in passage/opening 11 preferably extends vertically above the top of block 5 and below the bottom of block 5. A portion of cam 7 is preferably disposed in opening 11. A portion of cam 7 is preferably exposed within channel 32. A portion of cam 7 exposed in channel 32 preferably includes a hole 34 which is constructed and arranged to receive a member 36. Member 36 may be a roll pin, pin or set screw or another type of mechanical device.

Channel 32 in some embodiments may have arcuate opposite edges 38 and in other embodiments channel 32 may have non-arcuate shaped edges. The arcuate edges 38 in some embodiments engage member 36 functioning as rotational stops during rotation of the lever/cam.

In some embodiments the lower portion of the cam 7 may be machined or shaped in order to provide a non-circular cam surface 40. In some embodiments opening 11 through block 5 is round and is incrementally oversized relative to the diameter of the cam 7 including cam surface 40. In some embodiments, the lower portion of the cam 7 is disposed in opening 11 such that hole 34 is aligned with and is disposed in channel 32. Hole 34 is also preferably exposed in channel 32.

In some embodiments the inclusion of the channel 32 in the working face 30 of block 5, the use of the hole 34 in cam 7, and the placement of member 36 in whole 34 within channel 32, facilitates the ease of manufacture.

Member 36 may be inserted into the exposed hole 34 within channel 32. In some embodiments, the lower portion of the side of the cam 7 having hole 34 is uniformly semi-circular in shape, while the opposite side of cam 7 has a flattened cam surface 40 opposite to hole 34.

Ease of manufacture occurs through the greater control over manufacture variables in order to facilitate better clamping by cam surface 40 of cam 7. In the past, if machining of cam surface 40 of cam 7 was not precise, then slippage of the cam 7 relative to the block 5 occurred.

Figure 12:
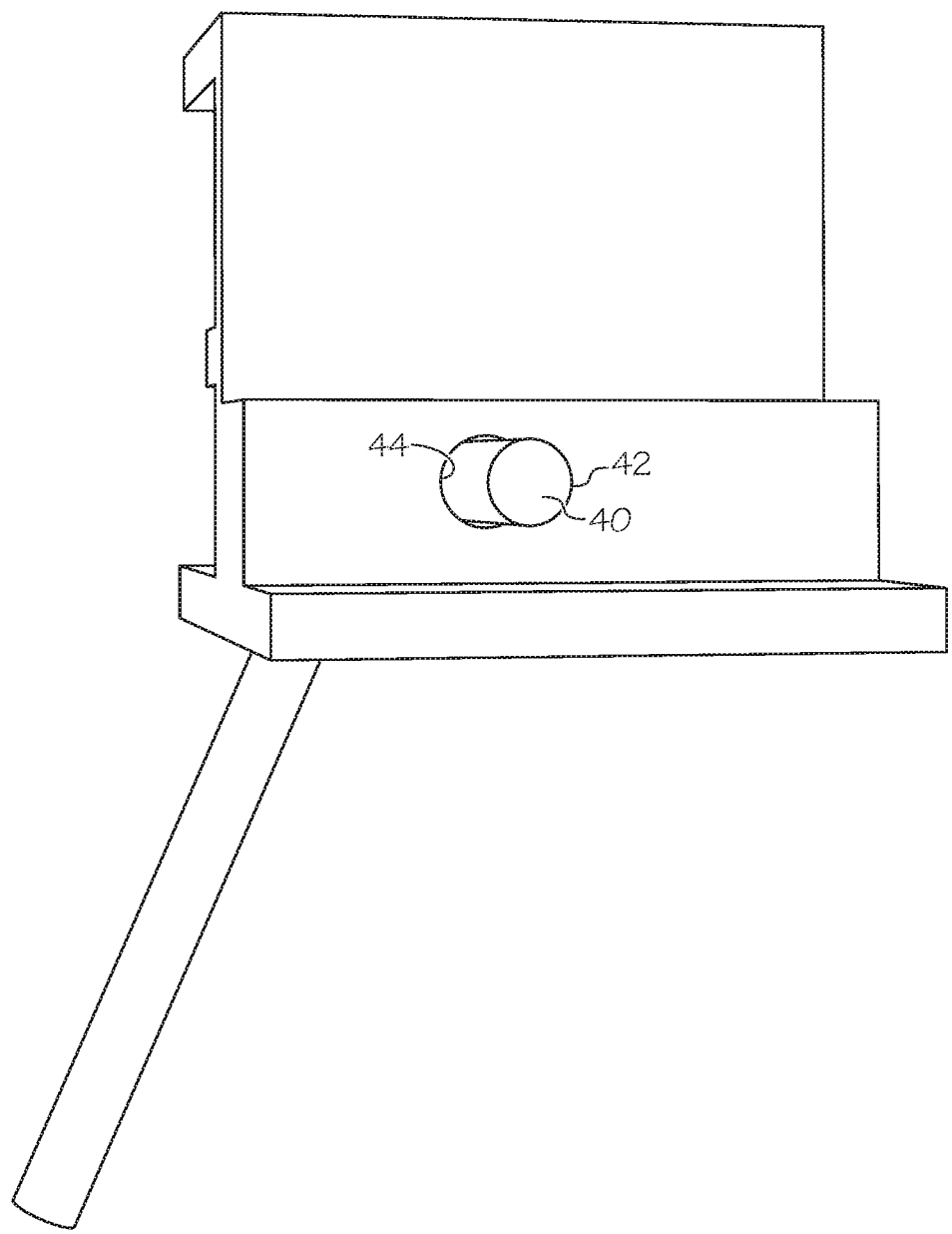
FIG. 12 shows a detail bottom view of one alternative embodiment of the invention.

In some embodiments safety to individuals is also enhanced because the cam 7 is retained in block 5 in a desired vertical position for rotation within opening 11. The cam 7 will not move vertically up or down because member 36 engages interior side walls of channel 32. In one embodiment an open channel 32 is added to the block 5 and a pin 36 is added onto the L-shaped lever which facilitates the retention of the L-shaped lever relative to the block 5. In some embodiments the L-shaped lever includes a notch which holds the member 36 on the cylindrical portion 42 of the lever lock. The notch and member 36 only permit the lever to move rotationally a certain amount, and vertically a certain amount, which keeps the lever from slipping. The inclusion of a channel 32 in the block 5 helps to lock the speed lead into a desired location. As may be seen in FIG. 12 the flattened cam surface 40 is opposite to the cylindrical surface 42. During assembly the shortened section of the L-shaped lever/cam 7 is inserted downwardly into opening 11 within block 5. The machining/shaping of the flattened cam surface 40 preferably establishes a ledge 44 which may be disposed within the lower opening 11. The hole 34 in L-shaped lever/cam 7 is preferably centrally aligned within channel 32, where member 36 may be inserted into hole 34 to fixedly and rotationally position L-shaped lever/cam 7 relative to block 5 and channel 32.

The above speed lead and bracket are herein described in certain embodiments, situations or cases which are used only for a presentation. The descriptions may be subject to changes, modifications, and substitutions without falling out of the spirit of the invention.

What is claimed is:

1. A bracket for holding a bricklayer's speed lead in position on a brick wall, said bracket comprising:
    a base adapted to be mounted on a brick wall, said base comprising a first vertical flange, a second vertical flange, a horizontal flange formed perpendicularly to said first and second vertical flanges and extending from one end of said second vertical flange to the approximate midway point of the length of said first vertical flange, a rectangular stepped block formed adjacent said horizontal flange and said first vertical flange at right angles to said horizontal flange and to said first vertical flange, said block having a horizontal channel and a vertical opening communication with said horizontal channel;
    a cylindrical shaft rotatably mounted through said vertical opening, said cylindrical shaft having a cam surface and an opposite surface, said opposite surface having a hole, said hole being positioned in said channel;
    a pair of prongs projecting inward from said second vertical flange;
    a bushing rotatably mounted between the prongs; and
    a member engaged to said hole, said member being disposed in said horizontal channel, said member securing said cylindrical shaft in a desired location relative to said block, said member permitting rotation of said cylindrical shaft relative to said block.

2. The bracket for holding a bricklayer's speed lead in position on a brick wall of claim 1 wherein the first vertical flange and the second vertical flange are the same length.

3. The bracket for holding a bricklayer's speed lead in position on a brick wall of claim 1 wherein the speed lead is facing forward with its outside edge held by the bracket.

4. The bracket for holding a bricklayer's speed lead in position on a brick wall of claim 1 wherein the speed lead is facing forward with its inside edge held by the bracket.

5. The bracket for holding a bricklayer's speed lead in position on a brick wall of claim 1 wherein the speed lead is facing backward with its inside edge held by the bracket.

6. The bracket for holding a bricklayer's speed lead in position on a brick wall of claim 1 wherein the speed lead is facing backward with its outside edge held by the bracket.

7. The bracket for holding a bricklayer's speed lead in position on a brick wall of claim 1 wherein the cylindrical shaft is rotated to tighten or loosen the bracket to allow the speed lead to be inserted or released.

* * * * *